United States Patent

[11] 3,631,784

| [72] | Inventor | Rolf Jurenz |
| | | Dresden, Germany |
| [21] | Appl. No. | 799,256 |
| [22] | Filed | Feb. 14, 1969 |
| [45] | Patented | Jan. 4, 1972 |
| [73] | Assignee | Kombinat Veb Pentacon Dresden Kamera- und Kinowerke |
| | | Dresden, Germany |

[54] REFLEX CAMERA HAVING A PRISMATIC VIEWFINDER AND PHOTOELECTRIC EXPOSURE METER
4 Claims, 2 Drawing Figs.

| [52] | U.S. Cl. | 95/42, 95/11 V |
| [51] | Int. Cl. | G03b 19/12 |
| [50] | Field of Search | 95/42, 10 C, 11 V |

[56] References Cited

UNITED STATES PATENTS

| 3,465,660 | 9/1969 | Trankner et al. | 95/42 |

FOREIGN PATENTS

| 1,216,098 | 5/1966 | Germany | 95/11 |
| 381,079 | 10/1964 | Switzerland | 95/11 |

*Primary Examiner*—Samuel S. Matthews
*Assistant Examiner*—Richard L. Moses
*Attorney*—Young & Thompson

ABSTRACT: A reflex camera has a prismatic viewfinder, a photoelectric exposure meter and two light guides. The light guides are positioned together on one surface of the viewfinder prism. The first light guide directs light from the viewfinder onto the photoconductive cell of the exposure meter. The second light guide directs light from the direction of the exposure measuring indicator of the exposure meter through the viewfinder.

PATENTED JAN 4 1972 3,631,784

INVENTOR
ROLF JURENZ
BY Young & Thompson
ATTYS.

REFLEX CAMERA HAVING A PRISMATIC VIEWFINDER AND PHOTOELECTRIC EXPOSURE METER

BACKGROUND TO THE INVENTION

The invention relates to a reflex camera with prism viewfinder and photoelectric exposure meter, the photoelectric cell being illuminated by the path of the taking rays, and also to measuring indicators reflected into the path of the viewfinder rays.

Viewfinder systems of the aforementioned kind are already known in connection with reflex cameras, the light-guiding devices being used, in conjunction with an image-erecting prism system, for the purpose of reflecting exposure measuring values, such as marks indicator needles scales or the like into the path of the viewfinder rays, or else the light-guiding devices, again in conjunction with pentaprisms for example, serve to condense part of the viewfinder light reflected out, and to convey it to one or more photoelectric elements provided on the light emission surface of light-guiding devices, in order to measuring the exposure. Insofar as the known reflex cameras with their optical devices, offer both possibilities, i.e. the measurement of the exposure in the path of the taking rays and the indication of exposure measuring values in the viewfinder, it should be noted that for each process separate optical devices, positioned in different planes, have hitherto been required, such as a light-guiding device for the exposure measurement and a "mark plate" situated in the plane of the image.

A reflex camera with an image-directing prism system is also known in which, by means of pentaprisms, parts of the viewfinder light flux are reflected onto a photoelectric cell, for the purpose of exposure measure, in addition to which exposure measuring values, such as marks, indicators or figures, are reflected into the path of the viewfinder rays. As regards this known apparatus, which uses no further light-guiding devices for the exposure measurement or for the indication of the exposure values, apart from the pentaprism, a drawback to which attention must be drawn is the fact that light emanating from the operation of reflecting the measuring values into the path of the rays finds its way onto the photoelectric cell, thus falsifying the measuring result.

The purpose of the invention is to ensure, when measuring values are reflected into the path of the viewfinder rays, that none of the light emanating from the illumination of the measuring values finds its way onto the photoelectric cell illuminated by the path of the viewfinder rays, in order to avoid falsification of the measuring result.

SUMMARY OF THE INVENTION

The invention enables this object to be achieved by a system in which, to enable part of the path of the taking rays to be reflected out for the illumination of the photoelectric cell, use is made of a first light guide, while for the operation of reflecting the measuring indicator into the path of the viewfinder rays, use is made of a second light guide, the light entry surface of the first light guide and the light emission surface of the second light guide being positioned side by side on one surface, of the prism viewfinder. According to a preferred embodiment, the light entry surface of the first light guide serving for the illumination of the photoelectric cell being positioned behind a partly reflective mirror-coated zone of the surface, while the light emission surface of the second light guide serving for the reflection of the measuring indicator is positioned behind a nonmirror coated zone of the aforementioned zone. The two light guides preferably form a constructional assembly which is affixed to the aforementioned surface of the prism viewfinder. In one advantageous version of the invention the aforementioned surface bearing the light guides, is the surface of a pentaprism.

The advantages offered by the invention reside in the provision of a number of light guides on one surface of the prism viewfinder, the reflection from the viewfinder light flux taking place on at least partly integral lines and the reflection of exposure measuring values taking place of the border of the image, outside or inside the image field. The system also ensures that no extraneous light is reflected into the path of the viewfinder rays, thus finding its way onto the photoelectric cell.

BRIEF DESCRIPTION OF DRAWINGS

The invention will be explained in conjunction with an example illustrated and described. The diagrams are as follows.

DESCRIPTION OF PREFERRED EMBODIMENT

Figure 1:
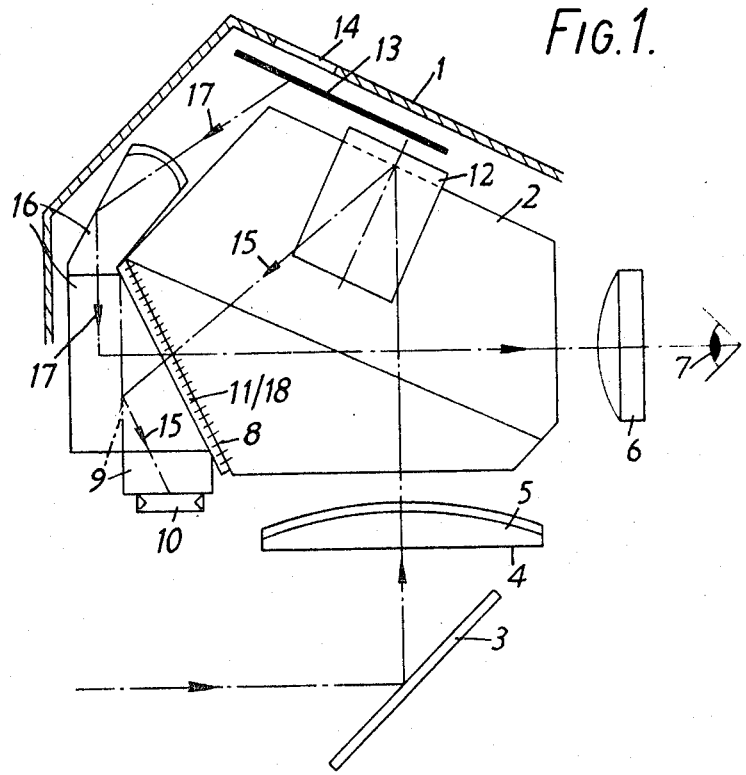
FIG. 1 is a lateral view of a prism viewfinder.
Figure 2:
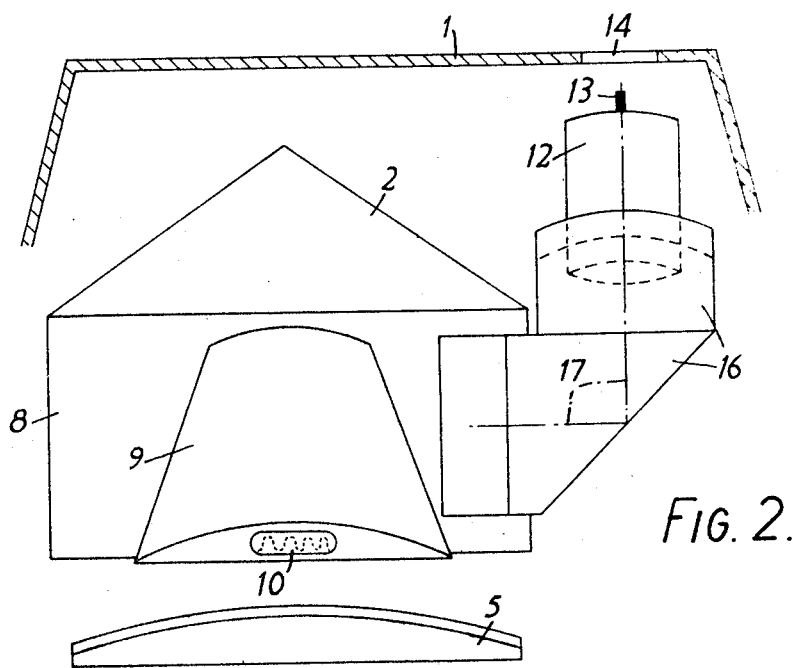
FIG. 2 is the corresponding front view.

Within a camera housing 1, partly shown in the drawing, is a "pentagonal roof prism" 2 which serves for the erection and lateral alignment of the image of the subject, produced in the image plane formed by the lens unit, not shown in the drawing and view the mirror 3. The image produced in he image plane 4 is received by the eye 7 of the observer via the image field lens 5 and the eyepiece 6. On one of the surfaces of the pentaprism 2, e.g. the partly mirror-coated, image-erecting surface 8, a first light guide 9 is provided, together with the photoelectric cell 10. Through the partly mirror-coated zone of the surface 8 of the pentaprism 2, part of the viewfinder light flux 15 reaches the light entry surface 11 of the light guide 9, whence in the known manner and by means of multiple total reflections within the light guide 9, it reaches the photoelectric receiver 10.

A photoelectric exposure meter 12 provided in the camera housing 1 and having a measuring indicator 13 is arranged in such a way that the measuring indicator 13 is visible through an aperture 14 in the camera housing 1. The measuring indicator 13 illuminated through the aperture 14 is reflected into the viewfinder system through a second light guide 16. By multiple reflections the path of the rays 17 is caused to pass from the measuring indicator 13 through the light emission surface 18 from the second light guide 16 into the pentaprism 2, in order to be received by the eye 7 of the observer, within or outside the image field, according to the position selected for the path of the rays 17, corresponding to the measuring values. The light emission surface 18 of the second light guide 16 is situated opposite to the image erecting surface 8 of the pentaprism 2.

The invention is by no means confined to the example illustrated. It is also possible, within the scope of the invention, for the light guides 9 and 16 to be positioned on other surfaces of the pentaprism 2 or parts of the prism viewfinder, such as the eyepiece or image field lens. It is likewise possible, without departing from the scope of the invention, for the light to be guided by the light guides 9 and 16 in such a way that it is guided both within and outside the viewfinder image. The light guides 9 and 16 can be given the appropriate shape and be constructed as one unit, as a number of units or in the form of clusters.

I claim:

1. In a reflex camera having a prismatic viewfinder, a photoelectric exposure meter including a photoconductive cell and a measuring indicator, and a first light guide located adjacent both the photoconductive cell and the viewfinder prism for directing light from the viewfinder prism to illuminate the photoconductive cell, the light guide being formed of one or more parts, the provision of a second light guide associated with the measuring indicator and viewfinder prism and being located adjacent said first light guide facing one surface of said viewfinder prism for directing light rays incident thereupon from the direction of the measuring indicator into the viewfinder prism.

2. A reflex camera according to claim 1, wherein the one surface of the viewfinder prism is a partly reflective mirror-coated surface and wherein the light entry surface of the first light conductor is positioned behind the partly reflective mirror-coated zone of said one surface, the light emission surface of the second light guide being positioned behind a nonmirror-coated zone of the said one surface.

3. A reflex camera according to claim 2, wherein the two light guides form a constructional assembly affixed to the surface of the prism viewfinder.

4. A reflex camera according to claim 3, wherein the surface on which the light guides are mounted is the surface of a pentaprism.

* * * * *